United States Patent
Han

(10) Patent No.: US 9,030,599 B2
(45) Date of Patent: May 12, 2015

(54) PHOTOGRAPHING APPARATUS AND IMAGE PROCESSING APPARATUS USING CODED LIGHT, AND METHOD THEREOF

(75) Inventor: Hee-chul Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 13/530,470

(22) Filed: Jun. 22, 2012

(65) Prior Publication Data

US 2013/0120601 A1     May 16, 2013

(30) Foreign Application Priority Data

Nov. 14, 2011 (KR) .................. 10-2011-0118413

(51) Int. Cl.
*H04N 5/222* (2006.01)
*H04N 5/235* (2006.01)

(52) U.S. Cl.
CPC .................. *H04N 5/2353* (2013.01)

(58) Field of Classification Search
CPC ............. H05N 5/2354; H05N 5/2356
USPC .............................. 348/370, 371
See application file for complete search history.

(56) References Cited

U.S. PATENT DOCUMENTS

| | | | |
|---|---|---|---|
| 7,580,620 B2* | 8/2009 | Raskar et al. | 396/55 |
| 7,756,407 B2* | 7/2010 | Raskar | 396/55 |
| 8,098,949 B2* | 1/2012 | Zalevsky et al. | 382/260 |
| 8,199,226 B2* | 6/2012 | McCloskey | 348/248 |
| 8,289,405 B2* | 10/2012 | Tsutsumi | 348/208.6 |
| 8,294,775 B2* | 10/2012 | McCloskey | 348/208.99 |
| 2007/0258706 A1* | 11/2007 | Raskar et al. | 396/52 |
| 2007/0258707 A1* | 11/2007 | Raskar | 396/52 |
| 2010/0201865 A1* | 8/2010 | Han et al. | 348/362 |
| 2010/0265386 A1* | 10/2010 | Raskar et al. | 348/340 |
| 2012/0069225 A1* | 3/2012 | McCloskey | 348/241 |

FOREIGN PATENT DOCUMENTS

| | | |
|---|---|---|
| KR | 10-2006-0018681 | 3/2006 |
| KR | 1020060029655 | 4/2006 |
| KR | 1020070032454 | 3/2007 |
| KR | 1020070061157 | 6/2007 |
| KR | 10-2007-0106275 | 11/2007 |
| KR | 1020100112788 | 10/2010 |
| KR | 10-2011-0103205 | 9/2011 |

OTHER PUBLICATIONS

Search Report and Written Opinion dated Jan. 10, 2013 issued in International Application No. PCT/KR2012/005044.

\* cited by examiner

*Primary Examiner* — Nicholas Giles
(74) *Attorney, Agent, or Firm* — Sughrue Mion, PLLC

(57) ABSTRACT

A photographing apparatus includes a light source to continuously emit a light, a photographing unit to photograph an object, a control unit to control radiation of the light by turning the light source on and off according to a light control code during a shutter time of the photographing unit, and an image processing unit to restore an image of the object using a frequency component value of the data captured at the photographing unit during the shutter time. Accordingly, efficient de-blurring is provided.

34 Claims, 12 Drawing Sheets

PHOTOGRAPHING APPARATUS AND IMAGE PROCESSING APPARATUS USING CODED LIGHT, AND METHOD THEREOF

CROSS-REFERENCE TO RELATED APPLICATIONS

This application claims priority under 35 U.S.C. 119(a) from Korean Patent Application No. 10-2011-0118413, filed on Nov. 14, 2011, in the Korean Intellectual Property Office, the disclosure of which is incorporated herein by reference in its entirety.

BACKGROUND

1. Field

The present general inventive concept relates to a photographing apparatus, an image processing apparatus, and a method thereof, and more specifically, to a photographing apparatus using a coded light, an image processing apparatus to process the photographed data, and a method thereof.

2. Description of the Related Art

Various photographing apparatuses have been introduced along with the advanced electronic technologies. For example, compact cameras or mobile phones equipped with digital camera technology provide high quality resolution images.

Conventional photographing apparatuses such as a digital camera, a mobile phone, a web cam, a CCTV, etc., may be used for everyday common purposes, and other types of specialized photographing apparatuses, such as an endoscope, may be used for a specialized purpose.

The conventional photographic apparatus may utilize image devices such as charge-coupled apparatuses (CCD) or complimentary metal oxide semiconductors (CMOS). The image devices convert lights reflecting from an object into electric charges to develop an image. If a user pushes the shutter, the light enters each image device through lenses during a time at which the shutter is pushed. The image devices generate electric charges according to an amount of light photons received, which are grains of light. The conventional photographing apparatuses utilize information regarding a quantity of the electric charges to determine pixel values of each pixel, and then to combine the pixels and develop images therefrom.

The conventional photographing apparatuses utilize the light reflecting from the object and develop the images. The light enters each image device during a time at which a shutter shield of the conventional photographing apparatus is open. If the subject of photography or the apparatus shakes during the time at which the shutter shield is open, the reflected light from one pixel may be divided and enter several image devices within the conventional photographing apparatus, causing the image blurring.

Various image processing methods have been developed to solve the image blurring. However, there is a problem when processing the images because the data photographed from the apparatus or a blurring kernel may not be found. To be specific, if the blurring kernel is non-linear, the edges of the image may have ringing even when the blurring kernel is expected.

Accordingly, there is a need for a photographing method that can reduce blurring in a photographed image.

SUMMARY

The present general inventive concept provides a photographing apparatus, an image processing apparatus, and a method thereof, which are capable of restoring an image using coded light.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a photographing apparatus including a light source to continuously emit a light, a photographing unit to photograph an object, a control unit to control an on and off of the light radiating operation of the light source according to a light control code during a shutter time of the photographing unit, and an image processing unit to restore an image of the object using a frequency component value of data corresponding to the object photographed at the photographing unit during the shutter time.

The light control code may be set to maintain the frequency component value of the data captured at the photographing unit during the shutter time at a range above a preset threshold.

The photographing apparatus may additionally include a storage unit to store therein the light control code.

The photographing apparatus may additionally include a code generating unit to generate the light control code and to provide the same to the control unit.

The image processing unit may include a point spread function (PSF) estimating unit to estimate the PSF with respect to coded photographed data captured by the light emitted during an on-interval of the light source, and a deconvoluting unit to perform deconvolution with respect to the coded photographed data using the estimated PSF.

The image processing unit may restore the image of the object by estimating u and k through repeated applications of a following minimization formula:

$$\min_{u,k} F(u, k) = \|u * k - u_{obs}\|$$

wherein, u denotes an original image of the object, k is PSF, and $u_{obs}$ is the coded photographed data.

The image processing unit may predict u*k by repeatedly applying a following minimization formula, presume k as linear PSF, and estimate $$\min_{u,k} F(u, k) = \|u * k - u_{obs}\|^2 + a_1 \|u\|_{TV} + a_2 \|k\|_{TV}$$

wherein, u denotes an original image of the object, k is PSF, $u_{obs}$ is the coded photographed data, $a_1$ is a weighted coefficient to determining degree of reflecting unsharpness of u, and $a_2$ is a weighted coefficient to determining degree of reflecting unsharpness of k.

The image processing unit may additionally include a converting unit to convert luminance component data of the deconvoluted photographed data at the deconvoluting unit into a frequency domain, a noise removing unit to remove noise from the converted data of the converting unit, a de-converting unit to de-convert the data from which the noise is removed at the noise removing unit, a filtering unit to filter chrominance component data from the deconvoluted photographed data at the deconvoluting unit, a first multiplying unit to blend a wavelet with the luminance component data processed at the de-converting unit, a second multiplying unit to blend the wavelet with the chrominance component data processed at the filtering unit, and a post-processing unit to generate an output image by combining the data output from the first and second multiplying units.

The image processing unit may additionally include a compensating unit to analyze a color domain of the output image generated at the post-processing unit and to perform color and contrast compensations.

The image processing unit may additionally include a compensating unit to analyze a color domain of the deconvoluted photographed data at the deconvoluting unit and to perform color and contrast compensation.

The photographing apparatus may be an endoscope, and the light source, while continuously radiating the light during a photographing preparation period, switches the light on or off in accordance with the control of the control unit upon starting of the shutter time.

The light may be a white light.

The light may be a spectrum light containing lights from different wavelengths.

The foregoing and/or other features and utilities of the present general inventive concept may also be achieved by providing a photographing method of a photographing apparatus including a light source to continuously emit light, may include performing photographing while controlling on and off of a light radiation of the light source in accordance with a light control code during a shutter time, in response to a pushing on a shutter that indicates to initiate the photographing of an object, and performing image processing in which an image of the object is restored using a frequency component value of data photographed during the shutter time.

The light control code may be set to maintain the frequency component value of the data captured at the photographing unit during the shutter time at a range above a preset threshold.

The photographing may include reading out the light control code from a storage unit, and controlling the on and off of the light source using the read light control code.

The photographing may additionally include generating the light control code, and controlling the on and off of the light source using the generated light control code.

The image processing may include carrying out point spread function (PSF) estimation with respect to coded photographed data which is captured according to the light emitted during an on-interval of the light source, and carrying out deconvolution with respect to the coded photographed data using the estimated PSF.

The image processing may include restoring the image of the object by estimating u and k through repeated applications of the following minimization formula:

$$\min_{u,k} F(u, k) = \|u * k - u_{obs}\|$$

wherein, u denotes an original image of the object, k is PSF, and $u_{obs}$ is the coded photographed data.

The image processing may include predicting u*k by repeatedly applying the following minimization formula, presuming k as linear PSF, and estimating u:

$$\min_{u,k} F(u, k) = \|u * k - u_{obs}\|^2 + a_1 \|u\|_{TV} + a_2 \|k\|_{TV}$$

wherein, u denotes an original image of the object, k is PSF, $u_{obs}$ is the coded photographed data, $a_1$ is a weighted coefficient to determining degree of reflecting unsharpness of u, and $a_2$ is a weighted coefficient to determining degree of reflecting unsharpness of k.

The image processing may include removing noise by converting luminance component data of the deconvoluted photographed data into a frequency domain, and performing de-conversion, filtering chrominance component data of the deconvoluted photographed data, blending a wavelet with the de-converted luminance component data and the filtered chrominance component data, and generating an output image by combining the data with which the wavelet is blended.

The image processing may additionally include performing color and contrast compensation by analyzing a color domain of the generated output image.

The image processing may additionally include performing color and contrast compensation by analyzing a color domain of the deconvoluted photographed data.

The photographing method may additionally include continuously radiating the light during a photographing preparation period.

The light may be a white light.

The light may be a spectrum light containing lights of different wavelengths.

The foregoing and/or other features and utilities of the present general inventive concept may also be achieved by providing an image processing apparatus including an input unit to receive an input of coded photographed data captured using a continuous light source which is controlled to be turned on and off in accordance with a light control code during a shutter time, and an image processing unit to restore an original image using a frequency component value of the coded photographed data.

The image processing unit may include a point spread function (PSF) estimating unit to perform PSF estimation with respect to coded photographed data, and a deconvoluting unit to perform deconvolution with respect to the coded photographed data using the estimated PSF.

The image processing unit may include a converting unit to convert luminance component data of the deconvoluted photographed data at the deconvoluting unit into a frequency domain, a noise removing unit to remove noise from the data converted at the converting unit, a de-converting unit to de-convert the data from which the noise is removed at the noise removing unit, a filtering unit to filter chrominance component data from the deconvoluted photographed data at the deconvoluting unit, a first multiplying unit to blend a wavelet with the luminance component data processed at the de-converting unit, a second multiplying unit to blend the wavelet with the chrominance component data processed at the filtering unit, and a post-processing unit to generate an output image by combining the data output from the first and second multiplying units.

The image processing unit may additionally include a compensating unit to perform color and contrast compensation with respect to the original image.

The foregoing and/or other features and utilities of the present general inventive concept may also be achieved by providing a photographing apparatus, including a light source to emit a light, a photographing unit to photograph an object, a code generating unit to generate a code based on properties corresponding to the object, a control unit to control the emission of the light based on the generated code during a shutter time, and an image processing unit to restore an image of the object based on photographed data generated from the light emission.

The photographed data acquired during one shutter time may be coded into a plurality of image intervals and non-image intervals.

The generated code may be further based on properties of an environment surrounding the object.

The code generating unit may selectively use a frequency component value of data corresponding to the object photographed at the photographing unit during the shutter time.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
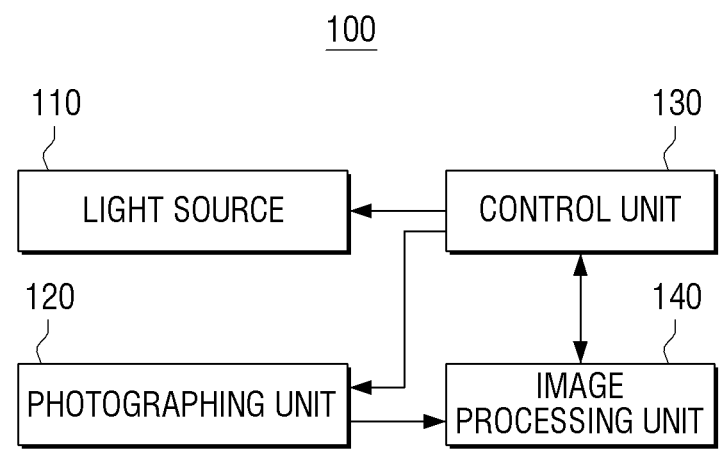
FIG. 1 is a block diagram of a photographing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram illustrating a photographing apparatus 100 according to an exemplary embodiment of the present general inventive concept. Referring to FIG. 1, the photographing apparatus 100 may include a light source 110, a photographing unit 120, a control unit 130, and an image processing unit 140.

The light source 110 may provide a light to perform a photographing operation. For example, the light source 110 may include a light bulb, a flash bulb, a light emitting diode (LED), and a strobe light, but is not limited thereto. The control unit 130 may control on and off functionality of a light emission of the light source 110 during a "shutter time." The "shutter time" describes a time during which a button of the photographing apparatus 100 is pressed by a user to perform a photographing operation, such that a shutter shield opens and closes to allow light to enter image devices within the photographing apparatus 100.

If a user selects a particular button to initiate the photographing operation, the control unit 130 may control the photographing unit 120 to perform the photographing operation. The photographing unit 120 may open the shutter shield within a particular specified shutter time to allow light to enter the image devices within the photographing apparatus 100, such that an image is captured. If the shutter time ends, the shutter shield may close and block the light so that the photographing operation is finished. The light source 110 may continuously emit the light necessary to perform the photographing operation. During the shutter time, the light source 110 may repeat the operation of turning the light on and off at least once according to a light control code. An interval corresponding to the turning on and off of the light, as well as a time corresponding to the turning on and off of the light, may vary depending on the light control code. The light control code may be provided in various ways according to various embodiments, which will be described below.

Meanwhile, data corresponding to the captured image that was photographed by using the light in on and off states during the shutter time may be coded to correspond to the light control code. In the light-on interval, a quantity of electric charges developed in the respective image devices varies according to a shape of an object being photographed. However, because the data has no light in the light-off interval, the image devices rarely develop the electric charges.

The image processing unit 140 may restore an image of an object by using a frequency component of the data photographed at the photographing unit 120 during the shutter time. Because a plurality of light-on intervals exists in one shutter time, a high frequency component of the data may be continuously maintained by the light quantity entering the image devices within the photographing apparatus 100 in the respective light-on intervals. Accordingly, exact boundary information may be acquired regarding the captured image by checking the frequency characteristic value of the data.

The image processing unit 140 may estimate a point spread function (PSF) by using the coded photographed data, and restore the image by carrying out deconvolution. The detailed processes will be described below.

Figure 2:
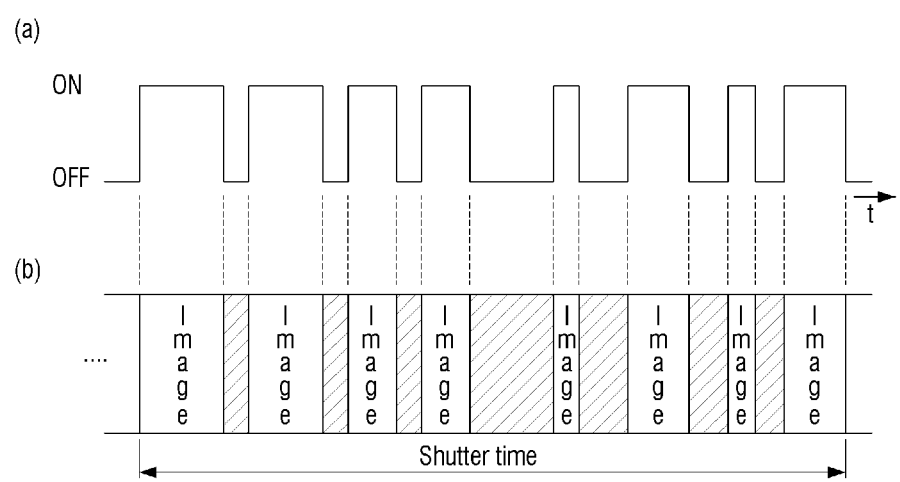
FIG. 2 is a diagram illustrating coded photographed data corresponding to an image captured by using coded light according to an exemplary embodiment of the present general inventive concept.

FIG. 2 illustrates a light condition (a) which is in an on or off state controlled according to a light control code and coded photographed data (b) corresponding to an image captured in the light condition (a).

Referring to FIG. 2, the light control code may include pulses having an irregular pattern, or may include a pseudo-random binary sequence.

If the light control code such as the one illustrated in FIG. 2 is provided to the light source 110 so that the light-on and light-off intervals are repeatedly arranged, the photographed data acquired during one shutter time may be coded into an image interval and a non-image interval as illustrated in (b) of FIG. 2. As used herein, the coded photographed data refers to such a pattern of data.

Figure 3:
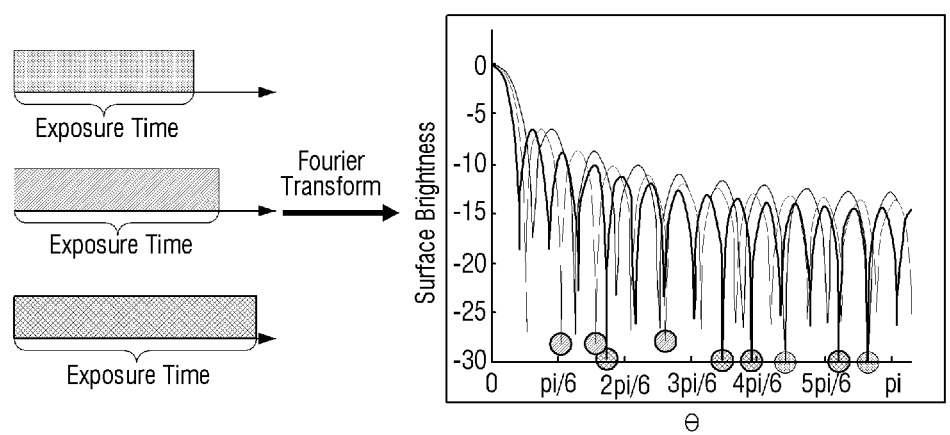
FIG. 3 is a graph illustrating frequency characteristic values of the coded photographed data according to an exemplary embodiment of the present general inventive concept.

FIG. 3 illustrates a graph of a frequency component value obtained by converting the coded photographed data in the light condition of FIG. 2 into a frequency.

In FIG. 3, an X-axis represents θ, and a Y-axis represents a surface brightness of an image.

Referring to FIG. 3, various exposure times may exist due to data acquired during the plurality of light-on intervals, and be converted into a plurality of frequency characteristic graphs represented by corresponding Airy Patterns. Various box filters of the motion PSF that appear in various sizes and shapes according to the exposure times may be included. Accordingly, even when one frequency is removed by one box filter, the frequency may not be 0 according to another box filter, resulting in all edges being restorable.

Figure 4:
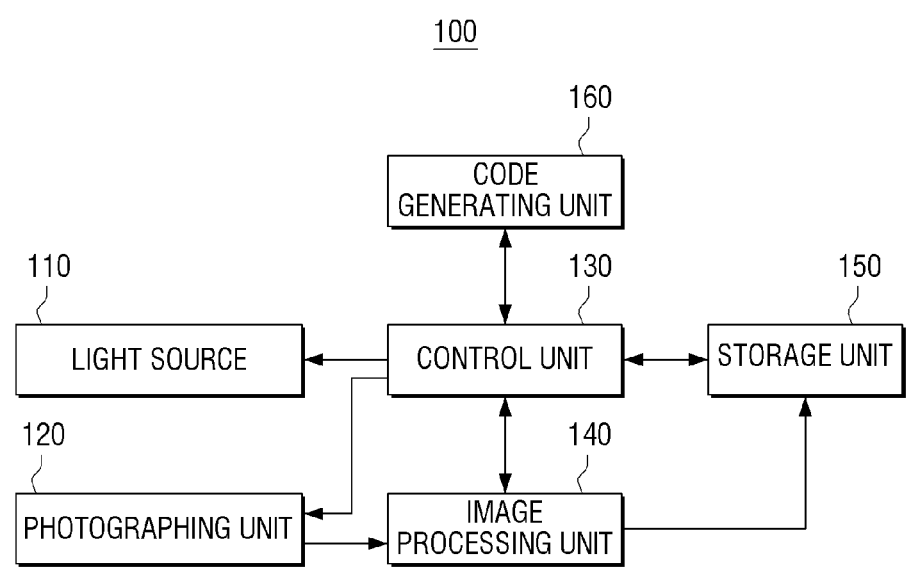
FIG. 4 is a block diagram of a photographing apparatus according to an exemplary embodiment of the present general inventive concept.

FIG. 4 is a block diagram of a photographing apparatus 100 according to an exemplary embodiment of the present general inventive concept. Referring to FIG. 4, the photographing apparatus 100 may include a light source 110, a photographing unit 120, a control unit 130, an image processing unit 140, a storage unit 150 and a code generating unit 160.

The storage unit 150 may store various data including photographed data acquired through the photographing unit 120 and data corresponding to an image restored at the image processing unit 140.

The storage unit 150 may additionally store a light control code. The light control code may be created such that a same size of on and off intervals are alternately arranged, such as in 10101010.

Alternatively, the light control code may be set to maintain a frequency component value of the data obtained through the photographing unit 120 during one shutter time at a range above a threshold. That is, the coded light may develop several exposure times, in other words, several light-on intervals during the shutter time. The frequency characteristic values of the data obtained in the respective light-on intervals may be sometimes found to be below a threshold or may have a value of 0. If the frequency characteristic value is 0, the data information of the image may disappear. Thus, based on the repeated experiments using several types of codes to check frequency characteristic values of the data, the light control code may be determined which does not show or show least component value 0. Accordingly, the light control code may be determined and stored in the storage unit 150 as fixed values. If the photographing apparatus 100 is embodied to be used for a specific purpose, such as an endoscope that photographs inner parts of the human body, movements of an object and the apparatus have similar pattern of direction and velocity to each other. Thus, because the working condition may not be much different, the light control code from the repeated experiments may be utilized to perform a light turning on and off operation.

After the photographing operation is performed, the control unit 130 may read the light control code stored in the storage unit 150, and control a turning on and off of the light of the light source 110. As such, the code generating unit 160 may be omitted.

However, according to the exemplary embodiment as illustrated in FIG. 4, the light control code may be generated in the code generating unit 160. The code generating unit 160 may be provided to utilize a more exact light control code corresponding to a photographing environment or specific features of the object being photographed.

The code generating unit 160 may generate code using information acquired in advance of the photographing operation during a photographing preparation process. That is, before a user pushes the button to activate the shutter, a real-time image may be acquired. The term "real-time image" refers to an image that is viewable during a moment that an object corresponding to the image faces a lens of the photographing apparatus 100. The real-time image may be shaken due to not only the movement of the photographing apparatus 100, but also the movement of the object. The movement of the photographing apparatus 100 may be detected by interior motion detecting sensors such as a geomagnetic sensor, a gyro sensor, or an acceleration sensor, but are not limited thereto. After information of the motion and the shaking is detected, occurrence and direction of the blurring may be predicted and the corresponding light control code may be generated.

The code generating unit 160 may repeatedly experiment with a plurality of light control codes to display the real-time image during the photographing preparation process, and may determine the light control code which does not allow (or minimizes) the case when the frequency component value of the photographed data to be 0. The determined light control code may be provided to the control unit 130. The control unit 130 may control the light source 110 by using the light control code generated from the code generating unit 160. Meanwhile, the code generating unit 160 may directly generate the plurality of light control codes, or may selectively apply the light control code stored in the storage unit 150 and determine an appropriate light control code to be used.

Alternatively, at least one of the storage unit 150 and the code generating unit 160 may additionally be provided. Although not illustrated in FIGS. 1 and 4, a communication interface to communicate with exterior apparatuses or a display to display the photographing may also be provided. Depending on embodiments, some blocks of FIGS. 1 and 4 may be excluded, and connection among the blocks may also change. For instance, if the photographing apparatus 100 does not process the image, the image processing unit 140 may be omitted. In such a case, the coded photographed data of the photographing unit 120 may be provided to an exterior image processing unit so that the image may be restored externally.

If the photographing apparatus 100 requires the light to be illuminated at all times, such as when using an endoscope, the light source 110 may continuously turn on the light in the photographing preparation period, while the light source may not always have to turn on the light if the photographing apparatus 100 is used for common purposes, such as those illustrated in FIGS. 1 and 4. For example, if the photographing apparatus 100 in FIG. 1 is an endoscope, the control unit 130 may cause the light source 110 to continuously turn on the light in the photographing preparation period, and then, as button controlling a shutter is pressed, to turn the light on and off according to the light control code during the shutter time.

Since the other elements of FIG. 4 are identical to those illustrated in FIG. 1, detailed description thereof will be omitted.

Figure 5:
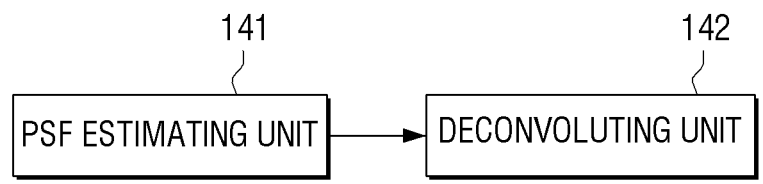
FIG. 5 is a block diagram of an image processing apparatus according to an exemplary embodiment of the present general inventive concept.

FIG. 5 is a block diagram illustrating the image processing unit 140 according to an exemplary embodiment of the present general inventive concept.

Referring to FIG. 5, the image processing unit may include a PSF estimating unit 141 and a deconvoluting unit 142.

The PSF estimating unit 141 may estimate a point spread function (PSF) regarding the coded photographed data which is captured according to the light emitted in light-on intervals of the light source. The PSF represents a spreading of one point and expressed as a function including variables such as angle or area of a shaking object. In other words, the PFS may be named as a motion blur kernel.

The photographing image may be modeled according to the following mathematical formula.

$$u_{obs} = u_{orig} * k + n$$ [Mathematical Formula 1], where, $u_{obs}$ is a photographed image, $u_{orig}$ is an original image that the photographing apparatus 100 intends to restore, (i.e., a desired image), k is the PSF, and n is noise.

After the photographing operation is performed, the image processing unit 140 may only know $u_{obs}$, while the other variables have not yet been calculated. Thus, the image processing unit 140 may estimate k while ignoring noise to obtain $u_{orig}$ and may perform deconvolution of k to both sides of Mathematical Formula 1. Accordingly, the image processing unit may obtain $u_{orig}$.

The PSF estimating unit 141 may estimate k, thereby estimating the PSF.

For instance, the PSF may be expressed as follows:

$$h(x, y) = \frac{1}{L}\Pi_L(u)(x\cos\theta + y\sin\theta),$$ [Mathematical Formula 2]

where, $$\Pi_L(u) = 1 \text{ or } 0,$$

where, x and y are coordinates (x, y) of the image, L is a length of the shaking, θ is the angle of the shaking, $\Pi_L(u)$ is 1 wherein the absolute value of the variable u is less than L/2, while $\Pi_L(u)$ is 0 wherein the absolute value of the variable u is more than L/2. The PSF estimating unit 141 may Fourier-convert the coded photographed data, and may binary-code a main lob of the data to estimate PSF parameters.

Generally, the PSF may be found in a motion blur (a) having sharp edges, an out-of-focus blur (b), a Gaussian blur (c) which gradually changes, and a scatter blur (d). As the coded photographed data is acquired in accordance with a turning on and off of the light source 110 during one shutter time, the data of the respective light-on intervals may have boundaries with respect to one another. Thus, the PSF estimating unit 141 may estimate the PSF by using the result of converting frequencies of the data of the respective light-on intervals.

The deconvoluting unit 142 may perform deconvolution using the estimated PSF, and restore the image of the object.

In addition, if the noise is ignored, Formula 1 may be written as $u_{obs}=u_{orig}*k$. By applying various combinations of $u_{orig}$ and k to $u_{obs}-u_{orig}*k$, $u_{obs}-u_{orig}*k$ with a minimum result may be obtained.

That is, the PSF estimating unit 141 may repeatedly apply a following formula to find u and k that correspond to the minimum result:

$$\min_{u,k} F(u, k) = \|u*k - u_{obs}\|$$ [Mathematical Formula 3]

The object image, $u_{orig}$ is written as u below.

The PSF estimating unit 141 may also apply the following minimization formula to estimate u*k:

$$\min_{u,k} F(u, k) = \|u*k - u_{obs}\|^2 + a_1\|u\|_{TV} + a_2\|k\|_{TV},$$ [Mathematical Formula 4]

where, $a_1$ is a weighting coefficient to determine a degree of reflecting an un-sharpness of u and $a_2$ is a weighting coefficient to determine a degree of reflecting an un-sharpness of k.

Since one shutter time has a plurality of light-on time, the motion blur may have a short time period. Thus, k may be estimated with a linear PSF.

The deconvoluting unit 142 may perform the deconvolution using k estimated from the foregoing formulae, and estimate u. This is known as blind deconvolution.

Meanwhile, the light emitted from the light source 110 may be white light. The light source 110 may emit the white light in every light-on interval using a plurality of LEDs.

According to FIGS. 1 and 5, the light source 110 may emit a spectrum light of different wavelengths. A light transmission may have different degrees depending on wavelengths corresponding to human skin, faces, or other body organs. If the photographing apparatus 100 is an endoscope, more detailed information may be found by applying the spectrum light. Thus, the light source 110 may emit the spectrum light by using the whole or a combination of the plurality of light emitting elements. The spectrum light may include the visible light such as red, orange, yellow, green, blue, navy, and purple, or even ultraviolet (UV) or infrared (IR) lights, but is not limited thereto.

The light source 110 may emit the spectrum light in one light-on interval, or may emit single light of different wavelengths in each light-on interval. For example, IR may be emitted in the first light-on interval, and the red or the orange light may be emitted in the next light-on intervals.

The spectrum light is not required to include every wavelength of the light. Depending on various embodiments, the spectrum light may include the light having specific wavelength such as the green light or the blue light. Combinations of the light may be determined according to a type of the photographing apparatus 100 and the photographing environment.

Figure 6:
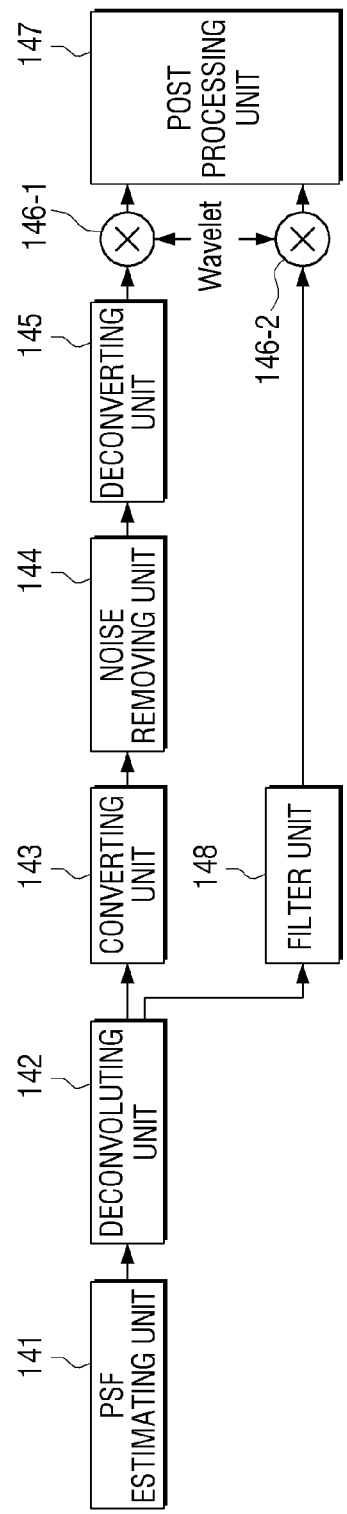
FIGS. 6 and 7 are detailed block diagrams of an image processing apparatus according to an exemplary embodiment of the present general inventive concept.

FIG. 6 is a detailed block diagram illustrating inner elements of the image processing unit 100 according to an exemplary embodiment of the present general inventive concept. Referring to FIG. 6, the image processing unit may include a PSF estimating unit 141, a deconvoluting unit 142, a converting unit 143, a noise removing unit 144, a deconverting unit 145, first and second multiplying units 146-1 and 146-2, respectively, a post processing unit 147, and a filter unit 148.

Since the PSF estimating unit 141 and the deconvoluting unit 142 are described above with reference to FIG. 5, description thereof will be omitted.

Even if the PSF estimating unit 141 and the deconvoluting unit 142 perform deblurring, the photographing data may experience noise. If the object is photographed in a low light, relatively high noise may have been included due to sensor sensitivity.

Accordingly, if an image is input, the image may be divided into luminance data and chrominance data and processed to remove the noise. The luminance and chrominance data may be divided by a separate separating unit provided within the image processing apparatus 140.

The converting unit 143 may convert the luminance data in the photographing data after the deconvolution that is performed by the deconvoluting unit 142. For instance, the converting unit 143 may carry out a Discrete Cosine Transform (DCT) or a Discrete Fourier Transform (DFT). The data converted at the converting unit 143 may be provided to the noise removing unit 144.

The noise removing unit 144 may remove the noise from the converted data. The noise removing unit 144 may determine the frequencies less than a threshold to be noise and remove the same. The threshold may be determined variously according to the type of the photographing apparatus 100. For instance, when the converting unit 143 converts the frequencies by performing the DCT, a magnitude of noise inserted to actual data may be detected to be minimal. Thus, it is possible to remove noise by removing the frequencies less than specific value. Because the magnitude of the noise may be different according to various photographing conditions and features of the object being photographed, one specific value is not fixed, but determined adaptively.

The deconverting unit 145 may deconvert the data after the noise removing unit 144 removes the noise.

The first multiplying unit 146-1 may blend the wavelet with the data from the deconverting unit 145 to planarize sides excluding edges. Thus, the noise in the sides having uniform features may be removed.

Meanwhile, the chrominance data may be filtered by the filter unit 148. The filter unit 148 may utilize a coincidence smoothing filter, such as a sigma filter to filter the magnitude of the chrominance data by the Gaussian distribution and may perform the smoothing while maintaining the edges of the image.

The second multiplying unit 146-2 may blend the wavelet with the data filtered from the filter unit 148 to perform planarization. The first and second multiplying units 146-1 and 146-2 may utilize a same wavelet.

The post processing unit 147 may combine the data generated from the first and second multiplying units 146-1 and 146-2, and generate an output image.

The generated output image may be provided to a display through an interface or may be stored in a memory.

Figure 7:
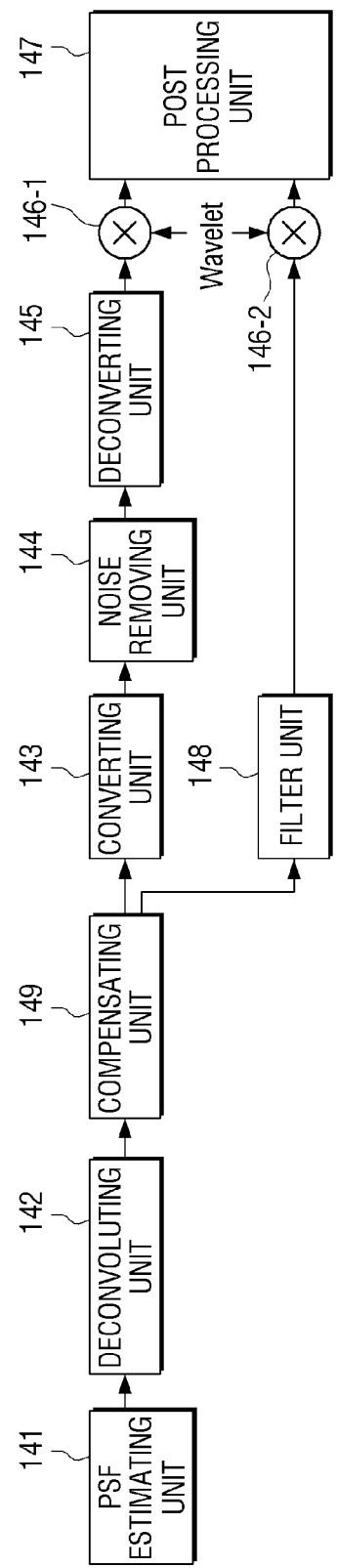

Meanwhile, according to another embodiment as illustrated in FIG. 7, the image processing unit 140 may additionally include a compensating apparatus to compensate color and contrast.

FIG. 7 illustrates the image processing unit 140 including a compensating unit 149 inserted in sequence after the deconvoluting unit 142 according to an exemplary embodiment of the present general inventive concept.

Since the rest of the components other than the compensating unit 149 are identical to those illustrated in FIG. 6, description thereof will be omitted.

The compensating unit 149 may analyze a color domain of data after deconvolution has been performed by the deconvoluting unit 142, in order to perform color and contrast compensation.

If bright lights are present during a photographing operation, a dynamic area of Y may expand to distort the colors. To be specific, in a night environment where complex lights such as incandescent bulbs or fluorescent bulbs are used, it may be difficult to restore color information, and the image distortion may be worse after deblurring. Thus, the compensating unit 149 may analyze statistic data of an input image, estimate the light, and compensate for the distortion.

That is, the compensating unit 149 may predict a light condition of the photographing data, determine a white point of the light condition, and enhance the color and the contrast based on the white point.

The compensating unit 149 may find a grey area of the photographing data. The compensating unit 149 may then determine a direction and a distance of the white point from a center of an output color domain. The compensating process will be described below with reference to an example where the output color domain is the standard color domain, such as a standard red green blue (sRGB) color domain. The compensating unit 149 may find which direction and how far the grey area of the photographing data moves from the grey area of D65, which is the white point of sRGB, and detect a vector of the color movement. The compensating unit 149 may move the center of the photographing data according to an inverse vector. In other words, the compensating unit 149 may move the center toward D65 by a determined ratio.

The compensating unit 149 may then expand the color and the contrast toward the direction of the image color domain to maintain the color under actual light. The expansion ratio may be determined by distance from the boundary of the output color domain and the boundary of the color domain of the photographing data. As a result, the color and the contrast may be corrected.

The light estimation may be performed by combining the analyses of the light correlations and color balance distortion.

Although the compensating unit 149 is included between the deconvoluting unit 142 and the converting unit 143 in FIG. 7, the compensating unit 149 may be included in sequence after the post processing unit 147.

In the embodiment of FIG. 7, the compensating unit 149 may detect the white point of the data of which noise is removed at the noise removing unit 144 and the filter unit 148, and may move the same toward the white point in the output color domain by the determined ratio. The compensating unit 149 may expand the color domain based on the detected white point and compensate for the color and the contrast.

The image processing unit illustrated in FIGS. 5 through 7 may be the image processing unit 140 included in the photographing apparatus 100 in FIGS. 1 and 4. In other words, the image processing unit 140 in FIGS. 1 and 4 may include elements as in FIGS. 5 through 7.

Alternatively, the image processing unit in FIGS. 5 through 7 may be provided as a separate, independent apparatus from the photographing apparatus 100 of FIGS. 1 and 4. For example, a host PC or a display connected to the photographing apparatus 100 may be implemented as the image processing unit in FIGS. 5 through 7. If the image processing unit is provided separately from the photographing apparatus 100, the image processing unit may additionally include an input to receive the photographing data from the photographing apparatus 100 or the other exterior sources. The input may also be a serial interface or known wired or wireless interface. In addition, if the input is additionally included, the PSF estimating unit 141 and the deconvoluting unit 142 may be characterized as one image processing unit within the image processing apparatus 100. An example of an endoscope having a separate image processing unit as described above is described later.

Figure 8:
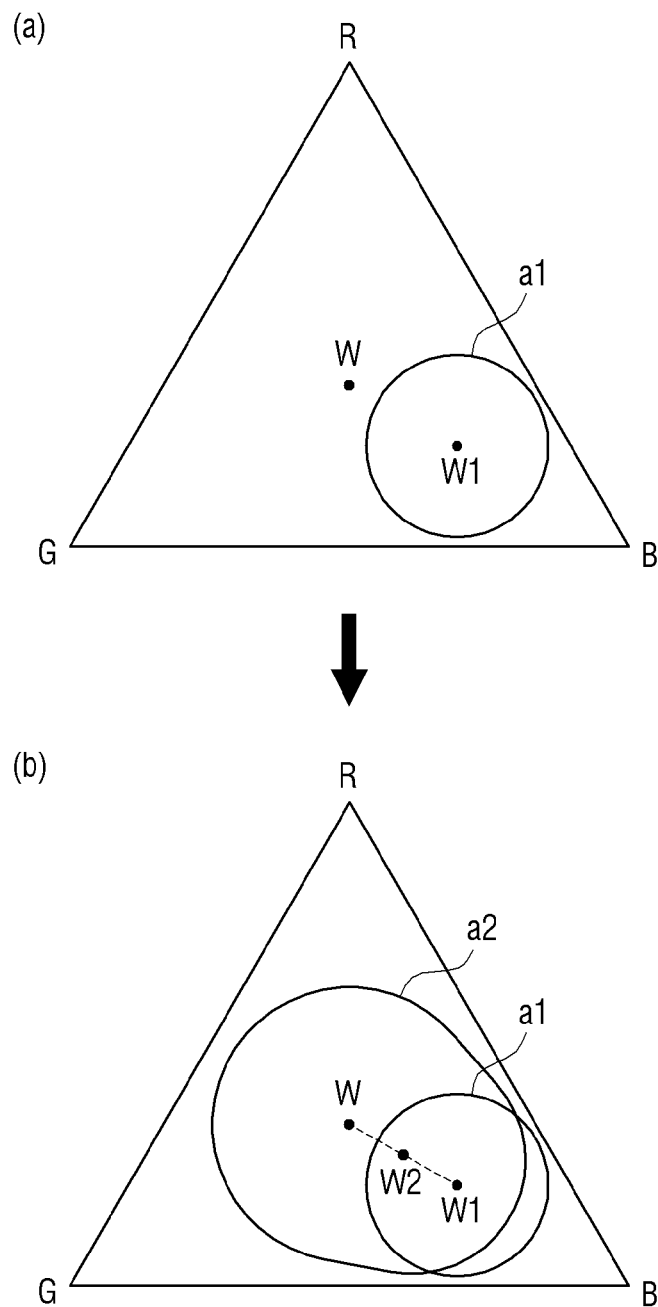
FIG. 8 is a diagram illustrating a method of compensating color domains of a photographing apparatus according to an exemplary embodiment of the present general inventive concept.

FIG. 8 is a diagram illustrating compensating of color and contrast.

Referring to (a) of FIG. 8, if a color domain of photographing data within an sRGB is a1, a photographing light environment of the photographing data may be estimated, and a white point w1 may be detected.

Then, w1 may be moved toward w, i.e., toward a white point of an output color domain by a determined ratio. The moving ratio may be automatically determined by considering a color temperature and a color distribution, or may be determined by user selection.

If a new white point is w2 as illustrated in (b) of FIG. 8, the color domain of the photographing data may expand based on w2. That is, the color domain may be corrected from a1 to a2. The color domain expansion may be linear in proportion to a distance from a boundary of the a1 color domain to the sRGB color domain.

In summary, using the coded light allows deblurring to be performed, noise to be removed, the color and the contrast to expand, and an original image of the object to be restored with improved clarity.

Figure 9:
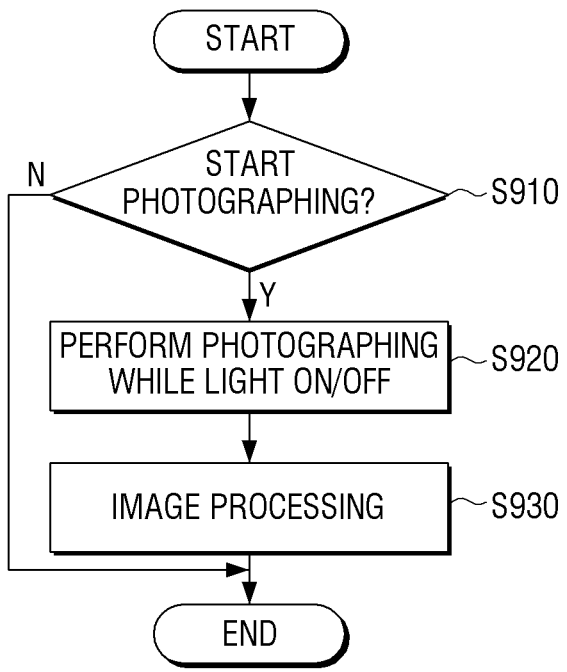
FIGS. 9 and 10 are flowcharts provided to explain a photographing method according to an exemplary embodiment of the present general inventive concept.

FIG. 9 is a flowchart illustrating a photographing method according to an exemplary embodiment of the present general inventive concept. Referring to FIG. 9, if the photographing starts at operation S910, a shutter opens and a light turns on and off as depicted in operation S920. The turning on and off of the light may be controlled according to a light control code. Then in operation S930, the image is processed.

Since a high frequency component of photographing data corresponding to captured image is maintained, more information corresponding to edges of the image is obtained, and deblurring may be performed to achieve higher clarity.

As explained above, the light control code is a value that is determined so that null values are not included, or are kept at a minimum. That is, while an image is considered a combination of various frequencies in the frequency domain, the blurred image is considered to be a multiplication of the blurred PSF of the respective frequencies. Thus, regarding the null value (i.e., an instance when the frequency is 0), it is difficult to restore the image because it is too blurry to be restorable. However, adjusting the light by using the light control code may have a higher frequency component, enabling easier restoration.

Also, an amount of light used if the light is turned on and off is less than an amount of light used when light is continuously illuminated during one shutter time. Thus, an intensity of emitted light may be increased as compared to a case where the light is continuously illuminated, so that the light quantity is maintained at a constant level irrespective of light on and off control.

Figure 10:
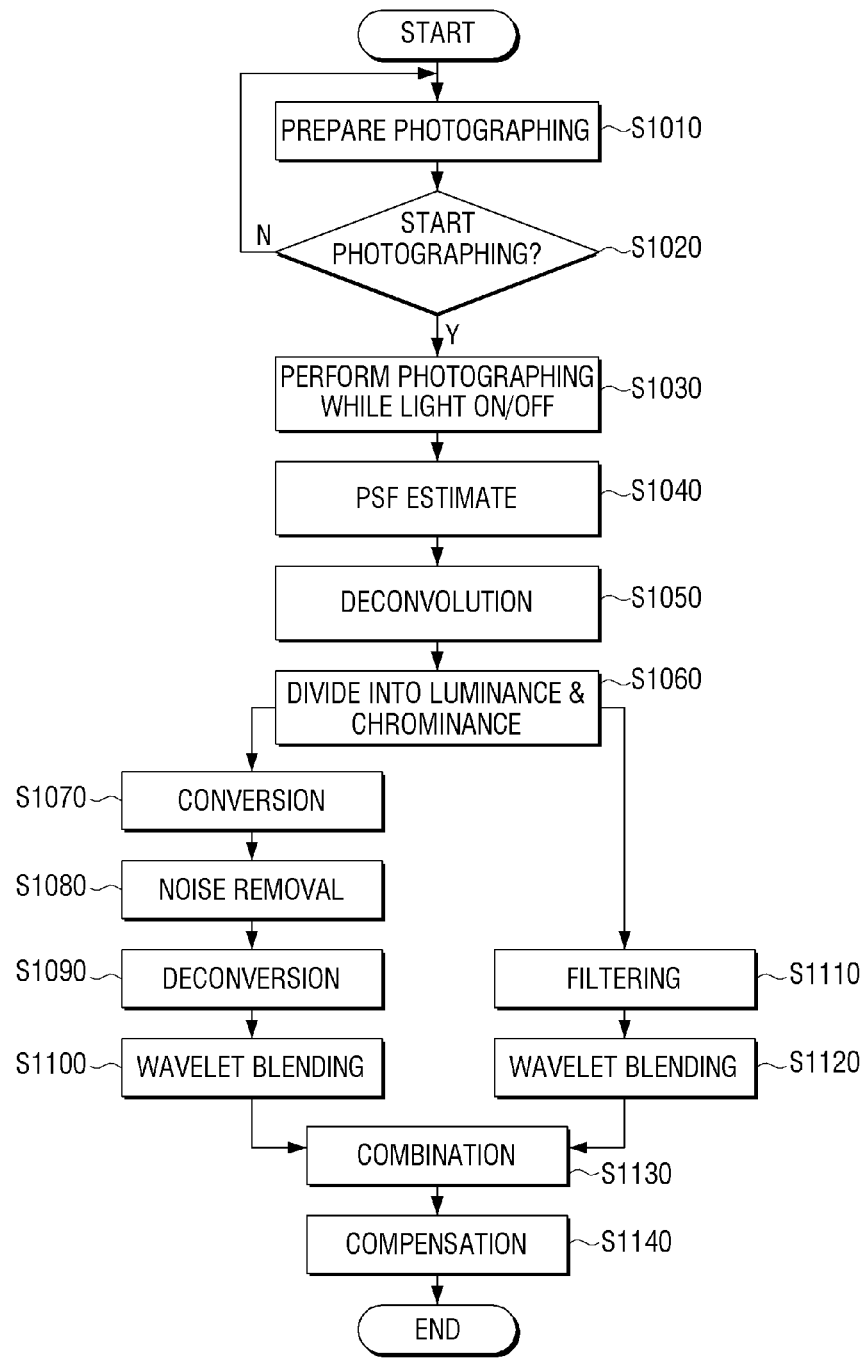

FIG. 10 is a flowchart illustrating a photographing method according to an exemplary embodiment of the present general inventive concept. Referring to FIG. 10, a real-time view may be provided in a photographing preparation process at operation S1010. If the photographing apparatus 100 is an endoscope, the light source 110 may continuously provide the light during the photographing preparation process to provide the real-time view. Controlling the light to turn on and off may not be performed in this example.

At operation S1020, if the user pushes a button controlling a shutter (i.e., a shutter shield), a photographing operation may start. That is, light is controlled to be turned on and off according to a light control code when the shutter shield is open to allow the light to enter respective image devices within the photographing apparatus 100. At operation S1030, photographing data may be generated by combining the lights entered into the respective image devices within the photographing apparatus 100 during one shutter time.

At operation S1040, if the photographing operation completes, a PSF of the photographing data may be estimated, and at operation S1050, deconvolution may be performed to acquire an original image. This process may be performed by blind deconvolution or other various methods as explained above.

At operation S1060, if the original image is restored, the image may be divided into luminance and the chrominance components.

At operation S1070, the luminance data may be converted to the frequency domain, at operation S1080, any existing noise may be removed, and at operation S1090, deconversion into time domain is performed. At operation S1100, a wavelet is multiplied by the deconverted data.

Meanwhile, at operation S1110, smoothing filtering is performed with respect to the chrominance data according to a Gaussian distribution, and at operation S1120, a wavelet may be multiplied similarly as done with the luminance data.

At operation S1130, the wavelets corresponding to the luminance and the chrominance data may be combined, and at operation S1140, the combined data is compensated. The compensation may be performed after the deconvolution (operation S1050). The compensating process is explained in detail above, so will not be further described.

As explained above, since the photographing method of FIG. 10 is performed using the coded light, the original image is restored to higher clarity. The photographing method may be implemented in not only the photographing apparatus 100 as illustrated in FIGS. 1 and 4, but also the other apparatuses with varied structures. In addition, except for the photographing step of the method explained with reference to FIGS. 9 and 10, an image processing method performed in the image processing unit 140 may be implemented.

Meanwhile, the photographing method or the image processing method may be implemented in an endoscope as well as in the other general photographing apparatuses. If the methods are performed in the endoscope, the light may be continuously kept on even during the photographing preparation process.

In the above-explained methods, the white light may be controlled to be turned on and off, and the spectrum light may also be controlled to be turned on and off.

Figure 11:
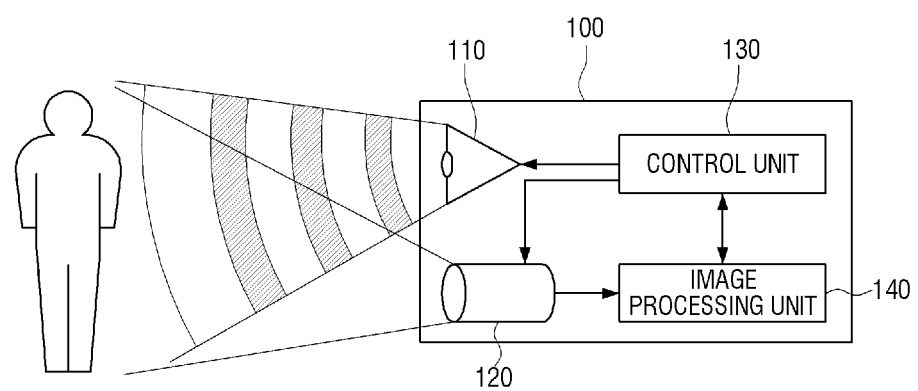
FIG. 11 is a diagram illustrating a photographing process using a photographing apparatus according to an exemplary embodiment of the present general inventive concept.

FIG. 11 is a diagram illustrating a photographing method using the photographing apparatus 100 according to an exemplary embodiment of the present general inventive concept.

Referring to FIG. 11, the photographing apparatus 100 may include a light source 110, a photographing unit 120, a control unit 130, and an image processing unit 140. The light source 110 may be repeatedly controlled to be turned on or off by the control unit 130, and may provide a patterned light toward an object. The light reflecting from the object may enter the photographing unit 120, and the photographing unit 120 may output the electric signals to the image processing unit 140. The image processing unit 140 may process the electric signals output from the photographing unit 120 to the image data. The entire aforementioned process may be controlled by the control unit 130.

Figure 12:
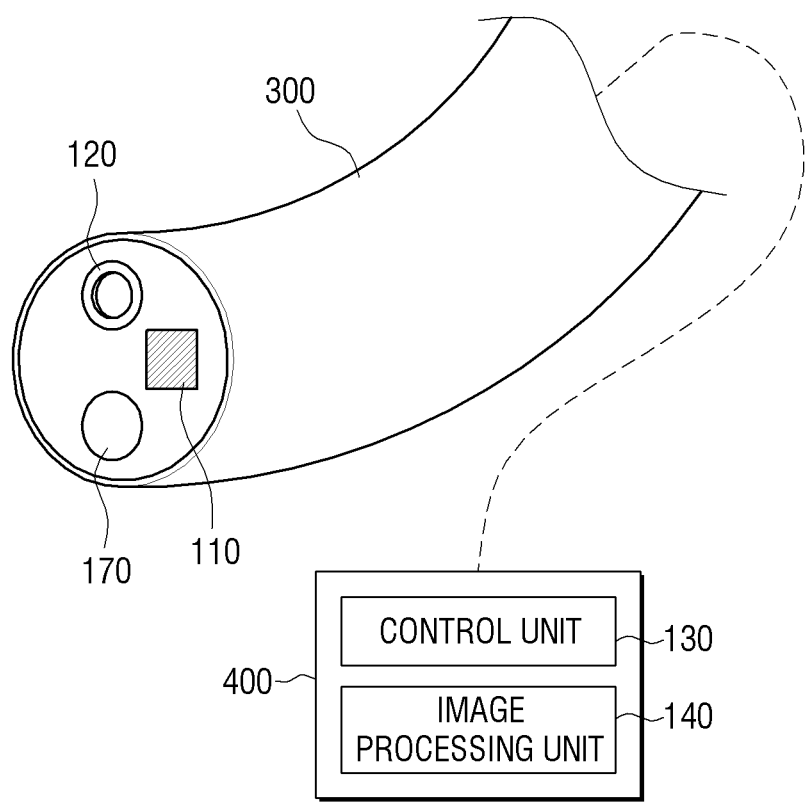
FIG. 12 is a diagram illustrating an endoscope implemented as the photographing apparatus according to an exemplary embodiment of the present general inventive concept.

FIG. 12 illustrates an endoscope 300 implemented as the photographing apparatus 100 of FIG. 4 according to an exemplary embodiment of the present general inventive concept. The endoscope 300 may include any type of instrument used to examine an interior of a hollow organ or cavity of the body. Referring to FIG. 12, the light source 110 may be placed on an end of the endoscope 300 to provide the patterned light. The photographing unit 120 may also be placed on an end of the endoscope 300 to collect the light reflecting from body organs according to the patterned light, and generate the image data. Additionally, other components such as a suction port 170 to remove a foreign substance may be provided on the end of the endoscope.

Meanwhile, in the endoscope as illustrated in FIG. 12, the control unit 130 and the image processing unit 140, as illustrated in FIG. 4, may be provided separately. The control unit 130 and the image processing unit 140 may be included in a main body 400 connected to the endoscope 300.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can generate or transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus comprising:
a light source configured to continuously emit a light;
a photographing unit configured to photograph an object;
a control unit configured to control an on and off radiation of the light emitted from the light source according to a light control code during a current shutter time of the photographing unit so that the photographing unit photographs the object to obtain coded image data of the object; and
an image processing unit configured to restore an image of the object using a frequency component value of the coded image data obtained by photographing the object during the current shutter time,
wherein the light control code is set to maintain a frequency component value of coded image data obtained by photographing the object, at a range above a preset threshold.

2. The photographing apparatus of claim 1, wherein the light control code is selected from a plurality of light control codes applied to a plurality of operations of photographing the object prior to the current shutter time.

3. The photographing apparatus of claim 2, wherein the selected light control code is a light control code which maintains the frequency component value of the coded image data obtained by photographing the object prior to the current shutter time above zero (0), or a light control code which maintains a minimum number of zero (0) frequency component values of the coded image data obtained by photographing the object prior to the current shutter time, among the plurality of light control codes.

4. The photographing apparatus of claim 1, further comprising:
a code generating unit to generate the light control code and to provide the same to the control unit; and
a storage unit configured to store therein the light control code.

5. The photographing apparatus of claim 1, wherein the image processing unit comprises:
a point spread function (PSF) estimating unit configured to estimate a PSF with respect to the coded image data obtained by photographing the object during the current shutter time; and
a deconvoluting unit configured to perform deconvolution with respect to the coded image data of the object obtained by photographing the object during the current shutter time, using the estimated PSF.

6. The photographing apparatus of claim 1, wherein the image processing unit is configured to restore the image of the object by estimating u and k through repeated applications of a following minimization formula:

$$\min_{u,k} F(u, k) = \|u * k - u_{obs}\|$$

wherein, u denotes an original image of the object, k is a PSF, and $u_{obs}$ is the coded image data.

7. The photographing apparatus of claim 1, wherein the image processing unit is configured to predict u*k by repeatedly applying a following minimization formula, presume k as a linear PSF, and estimate u:

$$\min_{u,k} F(u, k) = \|u * k - u_{obs}\|^2 + a_1 \|u\|_{TV} + a_2 \|k\|_{TV}$$

wherein, u denotes an original image of the object, k is a PSF, $u_{obs}$ is the coded image data, $a_1$ is a weighted coefficient to determining a degree of reflecting unsharpness of u, and $a_2$ is a weighted coefficient to determining a degree of reflecting unsharpness of k.

8. The photographing apparatus of claim 5, wherein the image processing unit further comprises:
a converting unit configured to convert a luminance component of the coded image data with respect to which the deconvolution is performed at the deconvoluting unit, into a frequency domain;
a noise removing unit configured to remove noise from the coded image data of which the luminance component is converted at the converting unit;
a de-converting unit configured to de-convert the coded image data from which the noise is removed at the noise removing unit;
a filtering unit configured to filter a chrominance component from the coded image data with respect to which the deconvolution is performed at the deconvoluting unit;
a first multiplying unit configured to blend a wavelet with the luminance component of the coded image data de-converted at the de-converting unit;
a second multiplying unit configured to blend the wavelet with the chrominance component at output from the filtering unit; and
a post-processing unit configured to generate the image of the object by combining data output from the first multiplying unit and data output from second multiplying units.

9. The photographing apparatus of claim 8, wherein the image processing unit further comprises a compensating unit configured to analyze a color domain of the image of the object generated at the post-processing unit and perform color and contrast compensations.

10. The photographing apparatus of claim 8, wherein the image processing unit further comprises a compensating unit configured to analyze a color domain of the coded image data with respect to which the deconvolution is performed at the deconvoluting unit and perform color and contrast compensation.

11. The photographing apparatus of claim 1, wherein the photographing apparatus is an endoscope, and the light source, while continuously radiating the light during a preparation period prior to photographing the object during the current shutter time, switches the on and off radiation of the light in accordance with a control of the control unit upon starting of the current shutter time.

12. The photographing apparatus of claim 1, wherein the image processing unit is configured to select, from among a plurality of combinations of at least one candidate original image of the object and at least one candidate point spread function (PSF), an original image and a PSF which satisfies a condition that a difference between the selected original image and the coded image data to which the selected PSF is applied is less than a difference between any one of the at least one candidate original image and the coded image data to which any one of the at least one candidate PSF is applied, and restore the image of the object using the selected original image and the selected PSF.

13. The photographing apparatus of claim 1, wherein the light is a spectrum light containing lights from different wavelengths.

14. A photographing method of a photographing apparatus, the method comprising:
performing photographing of an object while controlling an on and off radiation of a light emitted from a light source according to a light control code during a current shutter time of the photographing apparatus, to obtain coded image data of the object; and
performing image processing to restore an image of the object using a frequency component value of the coded image data obtained by photographing the object during the current shutter time,
wherein the light control code is set to maintain a frequency component value of coded image data obtained by photographing the object, at a range above a preset threshold.

15. The photographing method of claim 14, wherein the light control code is selected from a plurality of light control codes applied to a plurality of operations of photographing the object prior to the current shutter time.

16. The photographing method of claim 15, wherein the selected light control code is a light control code which maintains the frequency component value of the coded image data obtained by photographing the object prior to the current shutter time above zero (0), or a light control code which maintains a minimum number of zero (0) frequency component values of the coded image data obtained by photographing the object prior to the current shutter time, among the plurality of light control codes.

17. The photographing method of claim 15, wherein the image processing comprises:
selecting, from among a plurality of combinations of at least one candidate original image of the object and at least one candidate point spread function (PSF), an original image and a PSF which satisfies a condition that a difference between the selected original image and the coded image data to which the selected PSF is applied is less than a difference between any one of the at least one candidate original image and the coded image data to which any one of the at least one candidate PSF is applied; and
restoring the image of the object using the selected original image and the selected PSF.

18. The photographing method of claim 14, wherein the image processing comprises:
estimating a point spread function (PSF) with respect to the coded image data of the object obtained by photographing the object during the current shutter time; and
performing deconvolution with respect to the coded image data of the object obtained by photographing the object during the current shutter time, using the PSF.

19. The photographing method of claim 14, wherein the image processing comprises restoring the image of the object by estimating u and k through repeated applications of the following minimization formula:

$$\min_{u,k} F(u, k) = \|u * k - u_{obs}\|$$

wherein, u denotes an original image of the object, k is a PSF, and $u_{obs}$ is the image data.

20. The photographing method of claim 14, wherein the image processing comprises predicting u*k by repeatedly applying the following minimization formula, presuming k as a linear PSF, and estimating u:

$$\min_{u,k} F(u, k) = \|u * k - u_{obs}\|^2 + a_1 \|u\|_{TV} + a_2 \|k\|_{TV}$$

wherein, u denotes an original image of the object, k is a PSF, $u_{obs}$ is the coded image data, $a_1$ is a weighted coefficient to determining a degree of reflecting unsharpness of u, and $a_2$ is a weighted coefficient to determining a degree of reflecting unsharpness of k.

21. The photographing method of claim 18, wherein the image processing comprises:
converting a luminance component of the coded image data with respect to which the deconvolution is performed, into a frequency domain;
removing noise from the coded image data of which the luminance component is converted into the frequency domain;
de-converting the coded image data from which the noise is removed;
filtering a chrominance component data from the coded image data with respect to which the deconvolution is performed;
first-blending a wavelet with the luminance component of the de-converted coded image data;
second-blending the wavelet with the filtered chrominance component; and
generating the image of the object by combining data output from the first-blending and data output from the second-blending.

22. The photographing method of claim 21, wherein the image processing further comprises performing color and contrast compensation by analyzing a color domain of the image of the object output from the generating.

23. The photographing method of claim 21, wherein the image processing further comprises performing color and contrast compensation by analyzing a color domain of the coded image data with respect to which the deconvolution is performed.

24. The photographing method of claim 14, further comprising continuously radiating the light during a preparation period of the photographing during the current shutter time.

25. The photographing method of claim 14, wherein the light is a white light.

26. The photographing method of claim 14, wherein the light is a spectrum light containing lights of different wavelengths.

27. An image processing apparatus, comprising:
an input unit to receive input of coded image data obtained by photographing an object using a light source which is controlled to be turned on and off in accordance with a light control code during a current shutter time; and
an image processing unit to restore an original image using a frequency component value of coded image data obtained by photographing the object during the current shutter time, wherein the light control code is set to maintain a frequency component value of coded image data obtained by photographing the object, at a range above a preset threshold.

28. The image processing apparatus of claim 27, wherein the image processing unit comprises:
   a point spread function (PSF) estimating unit configured to estimate a PSF estimation with respect to the coded image data obtained by photographing the object during the current shutter time; and
   a deconvoluting unit configured to perform deconvolution with respect to the coded image data obtained by photographing the object during the current shutter time, using the estimated PSF.

29. The image processing apparatus of claim 28, wherein the image processing unit comprises:
   a converting unit configured to convert a luminance component of the coded image data with respect to which the deconvolution is performed at the deconvoluting unit, into a frequency domain;
   a noise removing unit configured to remove noise from the coded image data of which the luminance component is converted at the converting unit;
   a de-converting unit configured to de-convert the coded image data from which the noise is removed at the noise removing unit;
   a filtering unit configured to filter a chrominance component from the coded image data with respect to which the deconvolution is performed at the deconvoluting unit;
   a first multiplying unit configured to blend a wavelet with the luminance component of the coded image data de-converted at the de-converting unit;
   a second multiplying unit configured to blend the wavelet with the chrominance component output from the filtering unit; and
   a post-processing unit configured to generate the image of the object by combining data output from the first multiplying unit and data output from second multiplying units.

30. The image processing apparatus of claim 29, wherein the image processing unit further comprises a compensating unit configured to perform color and contrast compensation with respect to the generated image of the object.

31. A photographing apparatus, comprising:
   a light source configured to emit a light;
   a photographing unit configured to photograph an object;
   a code generating unit configured to generate a code based on properties corresponding to the object;
   a control unit configured to control the emission of the light based on the generated code during a current shutter time so that the photographing unit photographs the object to obtain coded image data; and
   an image processing unit configured to restore an image of the object based on the coded image data generated from the light emission,
   wherein the code is set to maintain a frequency component value of coded image data obtained by photographing the object, at a range above a preset threshold.

32. The photographing apparatus of claim 31, wherein the photographed data acquired during the current shutter time is coded into a plurality of image intervals and non-image intervals.

33. The photographing apparatus of claim 31, wherein the code is generated further based on properties of an environment surrounding the object.

34. The photographing apparatus of claim 31, wherein the code is selected from a plurality of light control codes applied to a plurality of operations of photographing the object prior to the current shutter time.

* * * * *